(12) United States Patent
Gunnarsson et al.

(10) Patent No.: US 9,212,776 B2
(45) Date of Patent: Dec. 15, 2015

(54) METHOD AND APPARATUS FOR INSTALLATION AND REPAIR OF INSULATED LINE PIPES

(75) Inventors: Lars Gunnarsson, Strängnäs (SE); Kjell Lidström, Bureå (SE)

(73) Assignee: TSC Innovation AB, Umeå (SE)

( * ) Notice: Subject to any disclaimer, the term of this patent is extended or adjusted under 35 U.S.C. 154(b) by 526 days.

(21) Appl. No.: 13/502,086

(22) PCT Filed: Oct. 15, 2010

(86) PCT No.: PCT/SE2010/051115
§ 371 (c)(1),
(2), (4) Date: Jun. 27, 2012

(87) PCT Pub. No.: WO2011/046503
PCT Pub. Date: Apr. 21, 2011

(65) Prior Publication Data
US 2012/0255640 A1 Oct. 11, 2012

(30) Foreign Application Priority Data

Oct. 16, 2009 (SE) ........................................ 0950764

(51) Int. Cl.
*F16L 55/16* (2006.01)
*F16L 59/16* (2006.01)
(Continued)

(52) U.S. Cl.
CPC ........... *F16L 59/165* (2013.01); *B29C 44/1295* (2013.01); *B29C 65/344* (2013.01);
(Continued)

(58) Field of Classification Search
CPC ........... A29C 66/0246; A29C 66/0242; A29C 66/81262; A29C 66/8122; Y02B 70/1441; Y02B 70/145; Y02B 70/1458; Y02B 70/1466

USPC ............... 138/97–99, 149.157, 171–176; 219/130.1, 130.21, 130.32; 363/17, 363/21.02, 21.03
See application file for complete search history.

(56) References Cited

U.S. PATENT DOCUMENTS 4,533,986 A * 8/1985 Jones .............................. 363/17
4,860,184 A * 8/1989 Tabisz et al. .................... 363/17
(Continued)

FOREIGN PATENT DOCUMENTS

CH 688887 A5 5/1998
DE 102007007287 A1 8/2008
(Continued)

OTHER PUBLICATIONS

International Search Report received for PCT Patent Application No. PCT/SE2010/051115, mailed on Jan. 17, 2011, 4 pages.
(Continued)

*Primary Examiner* — Lien Ngo
(74) *Attorney, Agent, or Firm* — Morrison & Foerster LLP

(57) ABSTRACT

A method for installation and repair of insulated piping includes placing a sleeve coupling, made of a weldable polymer material incorporating a slit that runs lengthwise along the piping, and whose length exceeds the distance between the outer pipes' ends, over the exposed section of the inner pipe so as to overlap the ends of the outer pipes, and welding the sleeve coupling to the outer pipe at the ends of the outer pipes, by placing an electrically conductive band between the outer pipe and the sleeve coupling, ensuring that free ends of the band project upward through the slit. A power converter which has a quasi-resonant converter is employed to produce the electric current that is to be connected to the band.

24 Claims, 7 Drawing Sheets

(51) Int. Cl.

| | |
|---|---|
| *B29C 44/12* | (2006.01) |
| *B29C 65/34* | (2006.01) |
| *B29C 65/00* | (2006.01) |
| *F16L 59/147* | (2006.01) |
| *B29C 65/78* | (2006.01) |
| *H02M 7/538* | (2007.01) |
| *H02M 1/00* | (2007.01) |
| *B29C 65/82* | (2006.01) |
| *B29L 23/00* | (2006.01) |

(52) U.S. Cl.
CPC ......... *B29C65/3468* (2013.01); *B29C 65/7841* (2013.01); *B29C 66/1122* (2013.01); *B29C 66/30341* (2013.01); *B29C 66/5326* (2013.01); *B29C 66/53241* (2013.01); *B29C 66/727* (2013.01); *B29C 66/72321* (2013.01); *B29C 66/81471* (2013.01); *B29C 66/8286* (2013.01); *B29C 66/91411* (2013.01); *B29C 66/91445* (2013.01); *B29C 66/91921* (2013.01); *F16L 59/147* (2013.01); *B29C 65/3476* (2013.01); *B29C 65/8246* (2013.01); *B29C 66/0242* (2013.01); *B29C 66/0244* (2013.01); *B29C 66/8122* (2013.01); *B29L 2023/225* (2013.01); *H02M 7/538* (2013.01); *H02M 2001/0077* (2013.01); *Y02B 70/1441* (2013.01)

(56) References Cited

U.S. PATENT DOCUMENTS

| | | | | |
|---|---|---|---|---|
| 5,272,313 | A * | 12/1993 | Karino et al. | 219/130.21 |
| 5,808,879 | A * | 9/1998 | Liu et al. | 363/17 |
| 6,115,273 | A * | 9/2000 | Geissler | 363/89 |
| 6,181,576 | B1 * | 1/2001 | Ikeda et al. | 363/17 |
| 6,269,015 | B1 * | 7/2001 | Ikeda et al. | 363/142 |
| 6,291,798 | B1 * | 9/2001 | Stava | 219/130.32 |
| 6,366,476 | B1 * | 4/2002 | Yasumura | 363/21.02 |
| 6,472,634 | B1 * | 10/2002 | Houston et al. | 219/130.5 |
| 6,560,128 | B1 * | 5/2003 | Rajda et al. | 363/50 |
| 6,906,931 | B1 * | 6/2005 | Batarseh et al. | 363/17 |
| 6,987,242 | B2 * | 1/2006 | Geissler | 219/130.1 |
| 7,054,167 | B2 * | 5/2006 | Yasumura | 363/16 |
| 7,061,777 | B2 * | 6/2006 | Zeng et al. | 363/17 |
| 7,558,037 | B1 * | 7/2009 | Gong et al. | 361/93.1 |
| 2007/0051712 | A1 | 3/2007 | Kooken et al. | |
| 2007/0081364 | A1 * | 4/2007 | Andreycak | 363/17 |

FOREIGN PATENT DOCUMENTS

| | | | | |
|---|---|---|---|---|
| EP | 1266745 | A2 | 12/2002 | |
| WO | WO 97/37167 | A1 * | 10/1997 | 138/99 |
| WO | 2006/037856 | A1 | 4/2006 | |

OTHER PUBLICATIONS

Extended European Search Report (includes Supplementary European Search Report and Search Opinion) received for European Patent Application No. 10823697.7, mailed on Sep. 29, 2014, 8 pages.

International Written Opinion received for PCT Patent Application No. PCT/SE2010/051115, mailed on Jan. 17, 2011, 4 pages.

International Preliminary Report on Patentability received for PCT Patent Application No. PCT/SE2010/051115, mailed on Apr. 26, 2012, 6 pages.

* cited by examiner

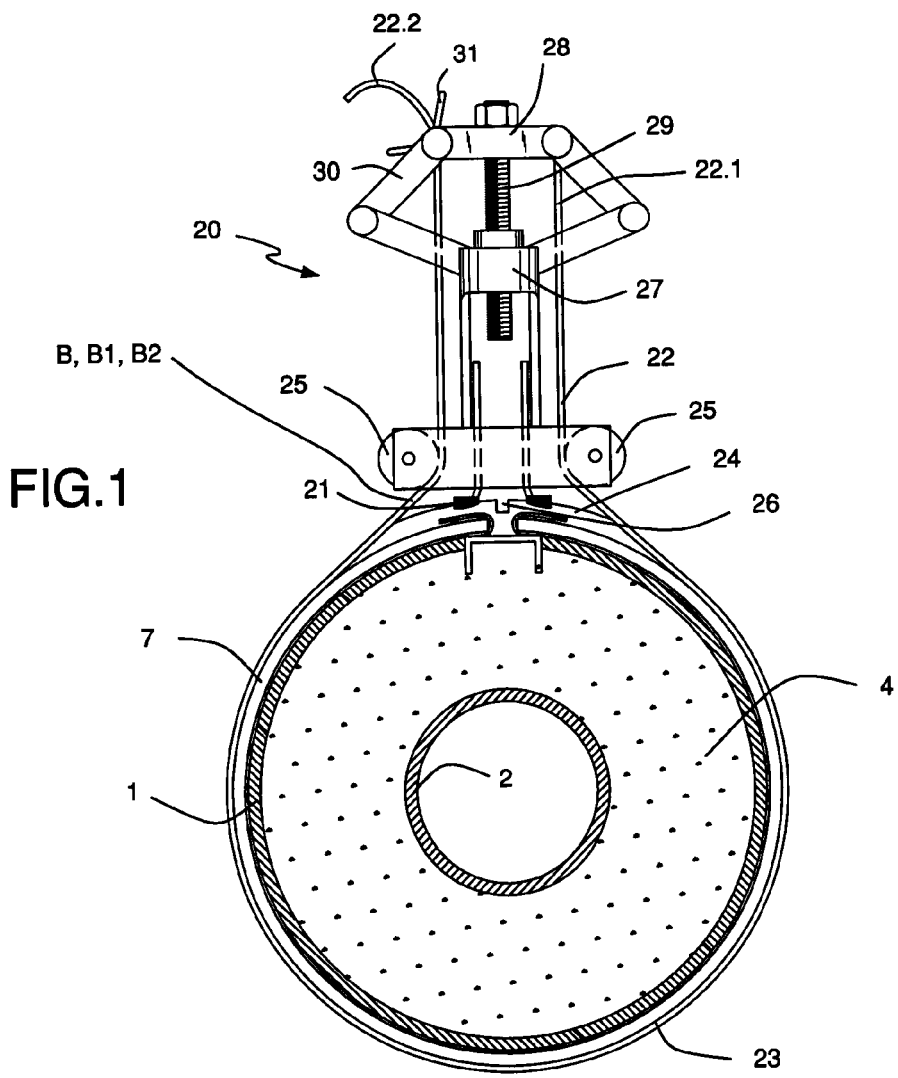
FIG.1
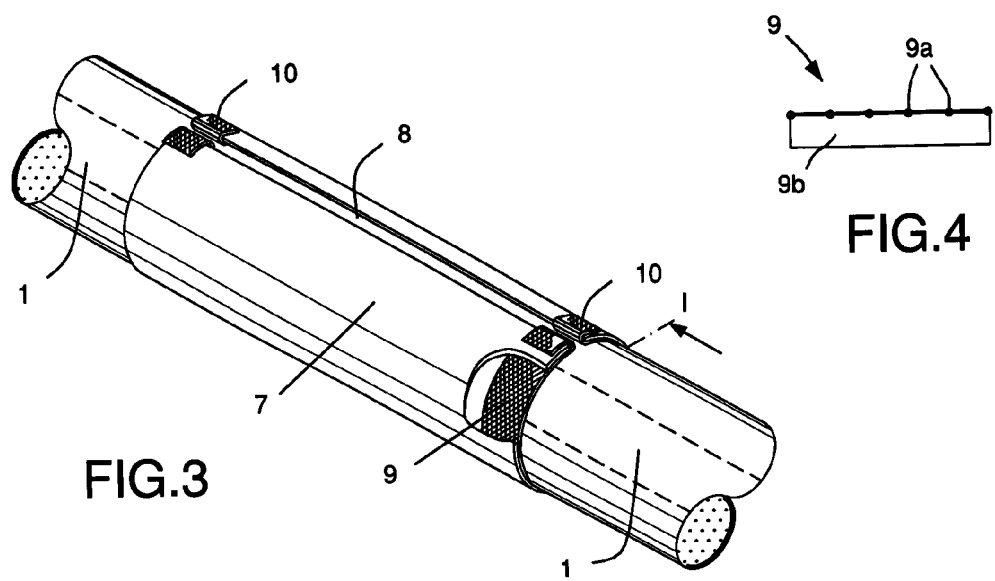
FIG.3
FIG.4

METHOD AND APPARATUS FOR INSTALLATION AND REPAIR OF INSULATED LINE PIPES

CROSS REFERENCE TO RELATED APPLICATIONS

This is a U.S. National Phase patent application of PCT/SE2010/051115, filed Oct. 15, 2010, which claims priority to the Swedish Patent Application No. 0950764-1, filed Oct. 16, 2009, each of which is hereby incorporated by reference in the present disclosure in its entirety.

FIELD OF TECHNOLOGY

The present invention relates to a method and apparatus for the installation and repair of insulated piping comprising an outer pipe made of a weldable polymer material that encases an inner pipe embedded in an insulating layer according to the preamble to independent Claims 1 and 9.

BACKGROUND

Insulated pipes are ordinarily used for transporting a flowing heating or cooling fluid, the medium, as in district-heating or district-cooling piping, and have a steel pipe for transporting the flowing fluid, the medium. The steel pipe is then embedded in insulation, usually made of polyurethane (PUR) foam, and on the outside there is an outer casing that protects from moisture, an outer pipe, made of a weldable plastic material, commonly of polyethylene and so-called HDPE. The piping is fabricated in a factory in sections, with an outer pipe, an inner pipe, and insulation, which are then transported out to the installation site. Insulated piping of this type can also be used for the transporting of oil and is then commonly called a "pipeline".

The piping is intended to be concealed underground, which entails large stresses. There will be a mechanical impact on the pipes owing to temperature changes, which result in expansion and contraction of the material. The piping is also exposed to water or moisture that can penetrate it and cause the steel pipe to corrode, which over time can result in leaking and consequently require repairs. The piping often runs under walls and the like, making it difficult and costly, in the event of leaking, to gain access to the damaged piping that has to be dug out.

Even though in certain district-heating piping there is, in the insulating foam between the steel pipe and outer pipe, an alarm wire, by means of which a leak can be located with relatively high accuracy, the cost of repairs will be high. Consequently, it is of greatest importance to produce installations—joints—of high quality and strength, both in new installation and when making repairs. Inconsistent quality, or, in the worst case, systematic defects in assembly, can in the long run be devastating to the overall economics of a district-heating system.

There are presently on the market a number of methods of joining the moisture-barrier outer pipe of district-heating piping. Experience has shown that methods that employ welded joints often have advantages over the long term, compared to other solutions. However, welding is not totally without problems.

The power supply is a major problem. There can easily be heavy power losses, because current transformation can be necessary and the current has to be conducted over relatively long distances to reach the welding site itself. The available power supplies are also not the best.

An example of prior art is EP 1266745, which presents a method and apparatus for electric-resistance welding of plastic pipes. The apparatus has a power unit for supplying current to a welding sleeve coupling. The document presents a welded sleeve coupling having two electrical contacts that make contact with two plastic-pipe ends. The contacts are connected to a power controller and to an alternating-current source. The power unit comprises a converter, transformer, rectifier, bypass circuit and filter circuit. The power unit operates at an operating frequency in the range of from 150 to 300 kHz. With these frequency levels, the power unit's output side has to be furnished with a rectifier and filtering circuits, resulting in heavy weight and major problems with efficiency and EMI radiation. In association with rectification and filtering on the output side, energy losses occur—through heating, for example—which has an adverse impact on efficiency. This is especially hard to overcome at higher powers.

DETAILED DESCRIPTION AND SPECIFICATION OF THE INVENTION

An object of the present invention is to provide a method and apparatus that, in a simple, safe and effective manner, enable a reliable supply of current for welding during the installation and repair of insulated piping so that a good joint is formed.

This object is achieved with the method and apparatus having the distinctive technical features presented in the characterizing clauses of Claims 1, 2, 12 and 13.

Exemplifying embodiments can be found in the dependent Claims.

Additional distinctive features and advantages of the invention will be presented in the following detailed description of the invention, which shall constitute an example, and thus shall not be interpreted in a manner that they limit the invention's scope of protection. To facilitate understanding, to the text have been added references to the attached drawings, in which equivalent or similar components have been provided the same reference designation.

BRIEF DESCRIPTION OF THE DRAWINGS

FIG. 1 shows an apparatus according to one embodiment of the present invention, placed on a sleeve coupling.

FIG. 3 shows a partial cutaway view of an assembly ready to be welded together according to one embodiment.

FIG. 4 shows a cross-sectional view of a welding band.

DETAILED DESCRIPTION OF EMBODIMENT EXAMPLES

Figure 2:
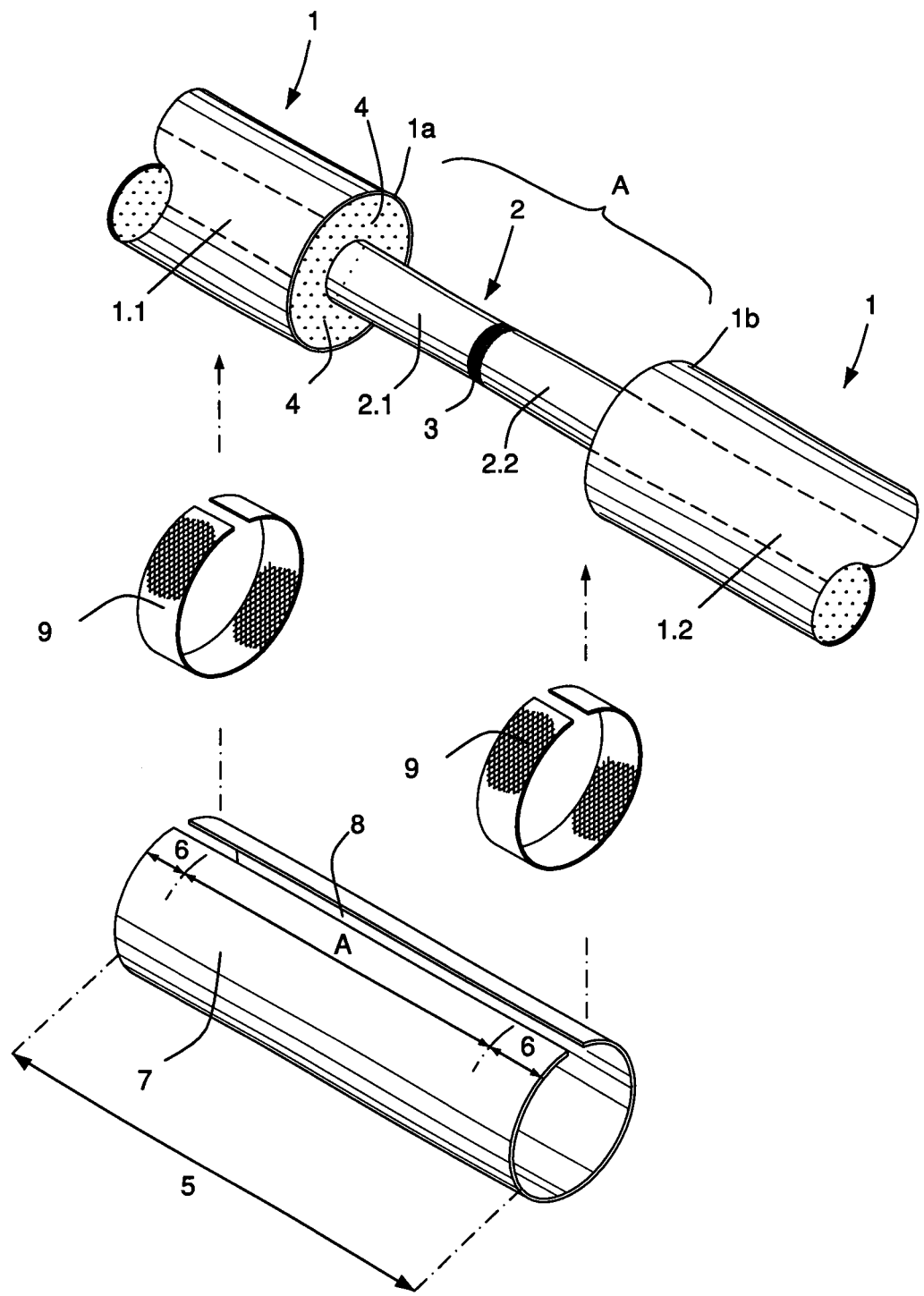
FIG. 2 shows diagrammatically a perspective view of disassembled parts of a pipe joint according to one embodiment of the present invention.
Figure 5:
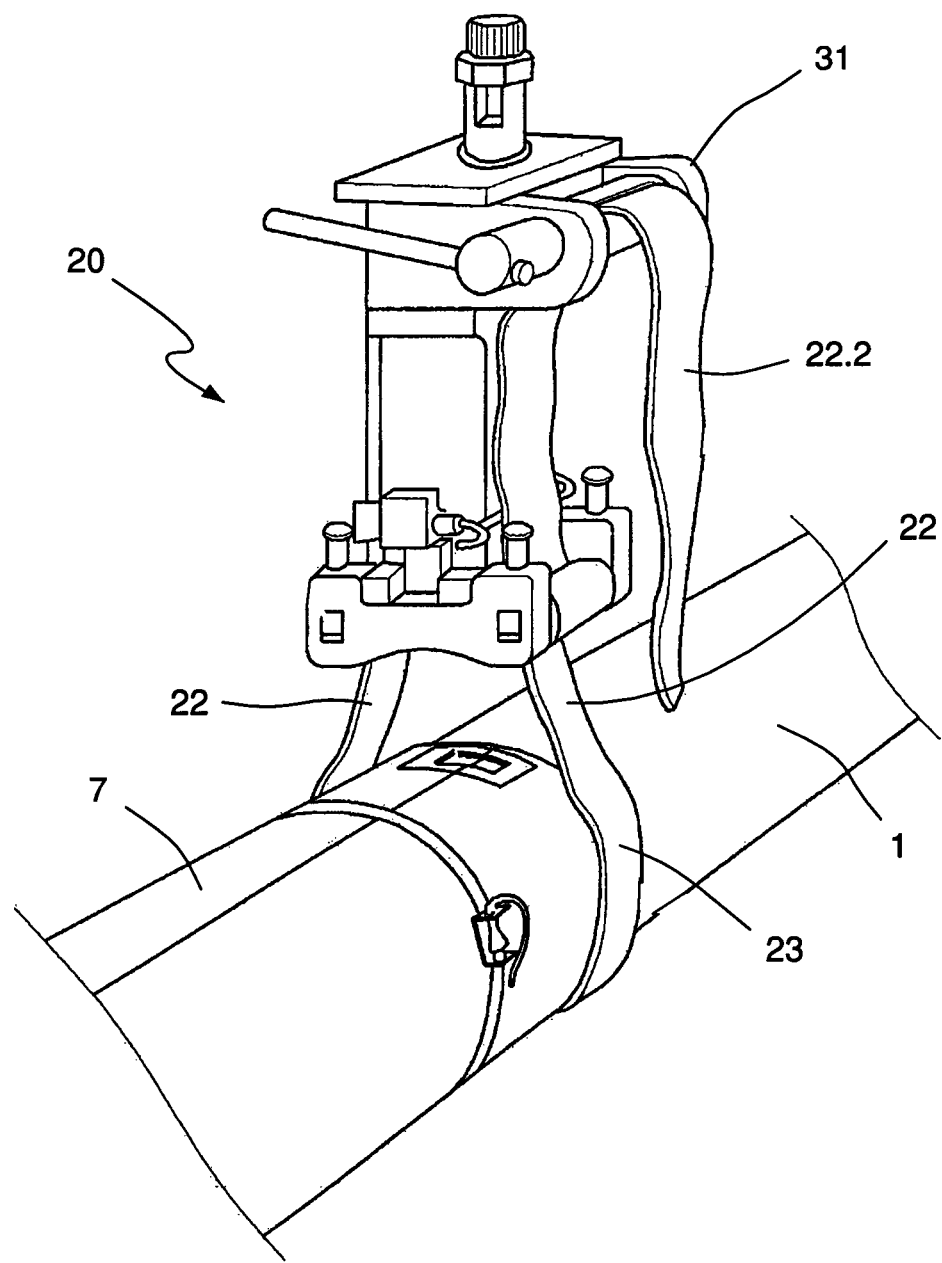
FIG. 5 shows an apparatus according to another embodiment of the present invention, placed on a sleeve coupling.
Figure 6:
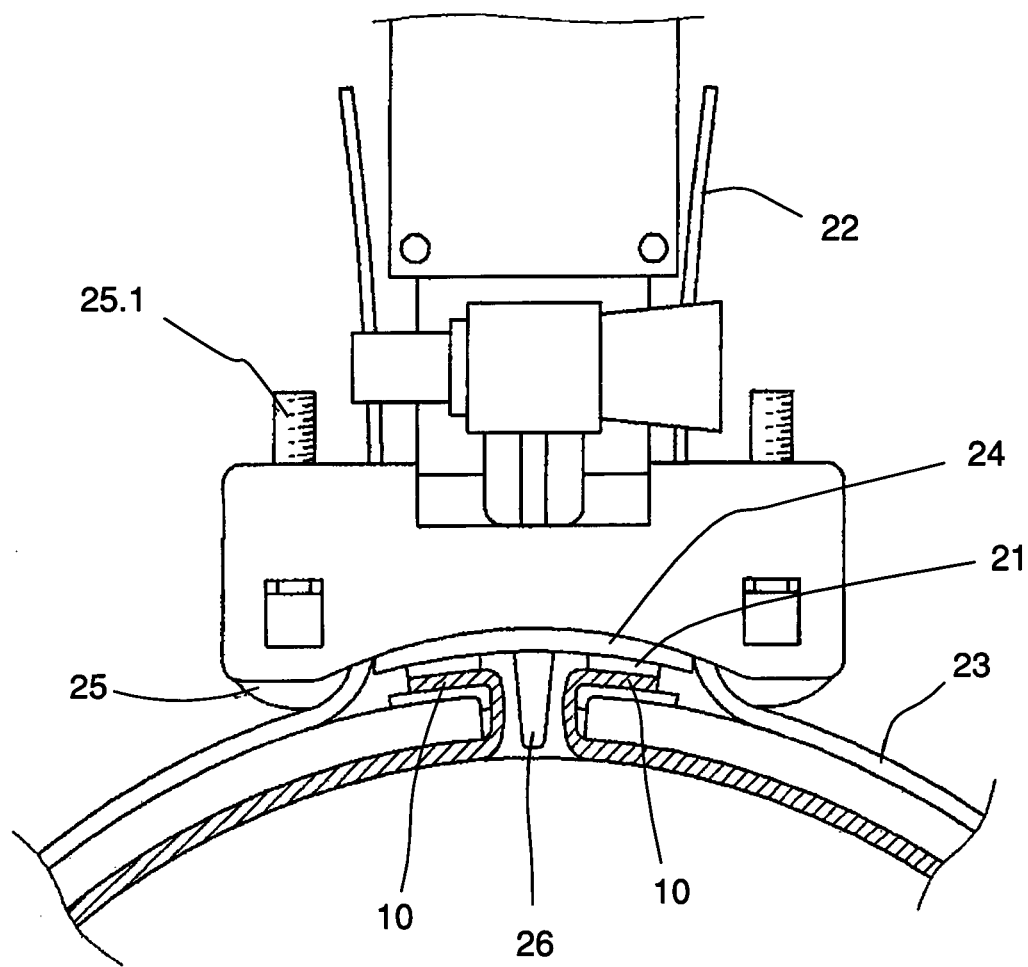
FIG. 6 presents a detailed overview of the apparatus in FIG. 5.

In the installation, or new installation, of district-heating pipes, or district-cooling pipes, comprising an outer pipe 1 made of a weldable polymer material and an inner pipe 2, the work is usually begun by laying at least two district-heating pipes, one after the other. Two projecting inner pipes 2.1 and 2.2 facing one another, which are usually made of steel, are then welded together and a weld joint 3 is formed.

In the repairing of already existing and installed pipes, the outer pipe 1 is removed along a damaged section A of the district-heating pipe or district-cooling pipe so that the inner pipe 2 is exposed and can be repaired. The insulation 4 that is placed between the outer pipe 1 and the inner pipe 2 is also preferably removed. In this state, the working area when a repair is made can be compared with the working area present after the inner pipes 2.1 and 2.2 are welded together during new installation. Similar joining work can be performed when repairing; however, the inner pipe 2 can also be repaired in another manner in order to restore its desired properties.

A sleeve coupling 7 is installed to connect the two outer pipes 1.1 and 1.2 to one another. The sleeve coupling 7 can be cut to the desired length 5 from a longer tubular workpiece made of a weldable polymer material. The length 5 is preferably the same as the distance A between the outer pipe's ends 1a and 1b with an additional length on each side equaling the sleeve coupling's overlap 6 for the desired width of the weld joint. It is expedient for the sleeve coupling's overlap 6 to be long enough for the overlap 6 to take part in making a circumferential weld joint that welds together the outer pipes 1.1 and 1.2 to the sleeve coupling 7. In one embodiment, the width of the circumferential weld joint is 40 mm and the overlap 6 at each end of the sleeve coupling is 100 mm.

The sleeve coupling workpiece, or at least the sleeve coupling itself 7, is cut lengthwise to form a longitudinal slit 8. The slit 8 makes it possible to position, to apply, the cut-to-length sleeve coupling 8 over the exposed section A of the inner pipe 2, or the inner pipes 2.1 and 2.2, and by overlapping the ends 1a and 1b of the outer pipe, even if the inner pipe 2 is intact.

The advantage of working with split, slit sleeve couplings 7 is that the same method can be used also for repairs when one wants to avoid cutting off the inner pipe 2. The contact between the sleeve coupling 7 and outer pipe 2 will also be better because no stresses originate in the sleeve coupling 7, because variations in diameter are compensated by the axial slit 8 in the sleeve coupling 7. A slit sleeve coupling 7 moves with less resistance over the outer pipe 1 and will not seize or bind in the way that a pipe that has not been slit can do that is to be slipped over another pipe.

To achieve the best result in the weld joint, the plastic surfaces to be welded together are abraded in order to thereby remove oxides and grime, which have an adverse impact on the weld joint's strength and tightness.

The sleeve coupling 7 is positioned, applied, over the joint, over the exposed section A of the inner pipe 2, or 2.1 and 2.2, and with overlapping of the ends 1a and 1b of the outer pipe.

An electrically conductive band 9 that is pervious to molten plastic material is cut to length or is cut to a length greater than the circumference of the outer pipe. The band 9, which can comprise a mesh 9a, or another body similar to a mesh, having openings uniformly arranged over its surface, and made of stainless steel, is inserted between one of the outer pipes 1.1 or 1.2 and the sleeve coupling 7 so that the band's free ends 10 project upward through the slit 8, which they enter from opposite directions. Then the ends 10 are bent back over the individual edges of the slit so that a space is formed between the ends 10 in the slit 8. The band 9, the mesh 9a, is laminated with a polymer material 9b. The polymer material 9b is placed on one side of the mesh 9a, and when the band 9 is placed between the outer pipe 1 and the sleeve coupling 7, the mesh 9a faces the outer pipe 1 so that the mesh 9a faces upward when the band ends 10 are bent over and around the edges of the slit.

Prior to application of the band 9 that will supply heat for welding, the oxide film on the polymer surfaces, the plastic surfaces, on both the sleeve coupling and pipe, is removed by abrasion. The oxide film on the band 9 is also removed when the band 9, the mesh 9a, is laminated with a polymer material 9b. This is expediently done by some sort of mechanical process; for example, by brushing the polymer material layer 9b.

It will also be fine to use a band that is not laminated with a polymer material, with no resulting impact on the functions and advantages of the invention.

The mesh 9a incorporated into the band 9 that will supply heat can be supplied in various widths, be straight-grained cut to length, and can be rolled up on an ordinary reel. This makes the cost of storage and transporting very low, and also provides the user great flexibility in, for example, when a need to repair suddenly arises, cutting to the proper length depending on the circumference of the pipe in question. The width of the band 9 is narrower than the overlap 6. The weld joint 3 becomes of an equivalent width and is narrower than the overlap.

Furthermore, the use of a mesh 9a, or of at least a structure similar to a mesh, for heating between the surfaces that are to be welded together, will mean very even distribution of heat over the entire length and width of the weld joint, resulting in a very high-performance, uniform weld joint.

The bent-up band ends 10 incorporating the electrically conductive components, the mesh 9a, can then each be connected to their own electrodes 21, that can be connected to a unit capable of supplying current sufficient to heat the band 9 to a temperature for melting the polymer material, the plastic material.

At least one power converter B1 connected to a voltage source is used to produce the current. The power converter B1 comprises a quasi-resonant converter B2 and a transformer.

The power converter B1 is designed to be tolerant, completely without a rectifier and filter circuits at its power output, which is very advantageous. This means lower cost, higher efficiency and a power unit of smaller size and lower weight. The quasi-resonant converter's design utilizes a power semiconductor and transformer that produce sinusoidal current, and it can be designed to operate at frequencies in the range of from 20 to 50 kHz. In this frequency range, one obtains an advantageous voltage curve with a small number of overtones that do not need to be filtered, distinct from when power conversion takes place at higher frequencies, as is usually the case in older technology.

It is important for a power unit that it used for welding when installing and repairing insulated pipes in the field and at installation sites to be lightweight and flexible. At the same time the requirements for higher power output have increased. It is desirable to provide two 3-kW power converters each in the same unit, which can thereby be used to operate separately in welding each their own pipe joint simultaneously, or be connected in series for full power for large joints up to 2 meters in diameter. At the same time, it is of advantage to limit the power output to 16 A per phase with a three-phase power supply, to avoid having a larger number of voltage sources. This is made possible by connecting each of the individual power converters to their own phase of the incoming line voltage.

To produce current for welding large joints, the invention provides a power unit having two series-connected power converters B1 each connected to its own phase, to two different phases of the line voltage. The two quasi-resonant converters B2 operate synchronously and sum the output voltage, i.e., perform a summation function, which means that there is no need for prior correction, rectification or filtering of each output power, which means that power conversion and the supplying of current will be efficient and occur with no energy loss.

The electrical safety requirements require electrical isolation of the line input from the power supply for the welding apparatus. Consequently, the power converter B1 incorporates a transformer for electrical isolation. There are now on the market small lightweight transformers that can be wired into the power converter B1 and that will contribute to low weight and small size as well as lower costs.

This means substantial advantages compared to older technology (the prior art) featuring power converters that have, for example, a 50-Hz transformer and a power thyristor, or hard-switched power electronics with a rectifier and filter at their power output, resulting in heavy weight and a lot of extra components to meet electromagnetic radiation (EMC) requirements and power factor requirements. A rectifier and filter circuits at their power output result in heat losses and impact the power converter's efficiency.

The circuit diagram for a power converter of the invention is presented in FIGS. 7 to 9, and is described in detail further below.

Before the band 9 is heated, a clamping device 20 is applied to the sleeve coupling 7 and the outer pipe 1 and presses the sleeve coupling 7 against the outer pipe 1 so that the band 9 is pressed between their surfaces.

After checking that all the parts are in the right position—for example, that the band 9 is in place and the sleeve coupling 7 overlaps the outer pipe's ends 1a and 1b the desired distance—the current can be connected to the band 9 via the electrodes 21. The entire band 9 is heated and the oxide-free plastic surfaces and the polymer material 9b around and incorporated into the band 9 fuse together. The current is shut off and a wide, completely melted-through weld joint has been formed.

An additional advantage of the present invention, and in particular of the employment of electric-resistance welding with a mesh resistance 9a in the circumferential weld joint, is that the method, the process, requires very little space to be able to be performed in, which results in low field-work costs. Furthermore, when the welding apparatus has been set up, it is possible to calmly check that everything is in place and that the connection between the apparatus electrodes and the welding mesh is good. At the time welding is taking place, there are no moving parts to be found that can have an adverse impact on the welding result and cause it to vary. The method can be implemented with a 230-V welding system or one rated for another relevant line voltage, for example, which simplifies the supplying of electric power and shortens set-up times, and also results in lower power-unit capacity requirements.

Before welding the sleeve coupling 7 to the outer pipe 1, the two outer pipes 1.1 and 1.2, the sleeve coupling 7 can be heated to a temperature above its crystalline temperature. Then the sleeve coupling 7 is cooled to its crystalline temperature, and finally the sleeve coupling 7 is heated again. Then the sleeve coupling 7 is welded to the outer pipe 1. This heating acts on the material of the sleeve coupling 7 and the outer pipe 1 in such a way that the temperature of the material is equalized and it makes uniform the thermal properties of the entire mass of material, or at least in the area that is to be welded, thus ensuring a good weld joint. The sleeve coupling 7 is heated when it has been installed between the two outer pipes 1.1 and 1.2, meaning that the pipes' ends 1a and 1b will also be heated when the sleeve coupling is being heated, which facilitates continued heating when welding together.

The clamping device 20 is removed and the same welding operation is performed at the other end of the sleeve coupling. If two apparatuses of the invention are available, both circumferential welds can be made at each end of the sleeve coupling at the same time, of course.

To reduce the risk of sparkover and damage when making circumferential welds, it can be of benefit to place heat-tolerant insulation between the band ends 10 in the slit 8 and between the bent-back band ends 10 and the sleeve coupling's 7 outer surface. For example, pieces of Teflon® or of a like material relatively resistant to heat can be used; a flexible material that pliably assumes various possible shapes may also be used.

When the sleeve coupling's 7 circumferential welds have been made and the clamping device 20 has been removed, the band ends 10 are removed in an expedient manner. In one embodiment this can be done by cutting them away from the slit 8, with a hand router or similar tool, for example. By cutting material away and enlarging the slit 8 near the circumferential weld joint, any pores or cracks that may be present in the junction with the slit are removed. In this way there can be complete overlapping between the lengthwise weld joint running along the slit and the previously made circumferential weld joints. This, in combination with the fact that the cutting-away exposes an oxide-free surface, ensures complete melt-through in every weld joint.

Then the slit 8 is welded to create a weld joint along the length of the sleeve coupling 7, along the entire length 5 of the slit. A continuous welding bead is laid along the entire length of the slit 8. Preferably a so-called extrusion welder is used for extrusion welding, which also supplies the weld joint with material.

When the joints have been welded, it is often desirable to pressure-test the new section before it is filled with insulation 4. For pressure testing, a hole is drilled in the sleeve coupling 7, in the area of the sleeve coupling 7 that is in the highest position. Following pressure testing, the hole is used for in filling-in insulation 4. Polyurethane foam, for example, can be injected. Locating the hole at the highest point will make it possible to force out, by means of the insulation 4, a maximum of the air present in the space.

Other holes can also be made if that is deemed to be expedient. When the hole space inside the sleeve coupling 7 has been filled with insulation 4—foam—the hole is drilled, routed or reamed to a conical shape, for example, and a plastic plug made to fit the shape of the hole—a conical plug, for example—is cemented or welded fast in the hole, by means of a mirror welder, for example, or other unit suitable for the purpose.

The apparatus of the invention comprises a clamping device 20 for pressing an outer pipe against an inner pipe, in particular, a slit pipe sleeve coupling 7 slipped onto an outer pipe 1 on an insulated inner pipe 2—piping. The clamping device 20 comprises a flexible clamping band 22 arranged in a loop 23 so that the clamping band's free ends 22.1 and 22.2 can be connected to a tensioning device 24-30. The clamping band 22—the loop 23—when it is placed around the sleeve coupling 7—around the circumference of the sleeve coupling—is able to press the sleeve coupling 7 against the pipe 3 by the action of the tensioning device.

The tensioning device 24-30 that can tension—tighten—the loop 23 comprises at its ends a support component 24—a foot component, a contact area—designed to rest against the sleeve coupling 7. Furthermore, joined to the support component 24 are two parallel contact rollers 25 at a distance from one another that is substantially smaller than the diameter of the sleeve coupling. The position of the contact rollers 25 can be adjusted depending on the size—the diameter—of the sleeve coupling, by means of a position-adjusting device 25.1, expediently a screw, or bolt, placed at the end of each individual contact roller 25, where rotation of a screw changes the position of the end of the contact roller 25 towards or away from the sleeve coupling 7.

By placing the clamping band 22 between the contact rollers 25, i.e., because the loop's—the clamping band's—free ends 22.1 and 22.2 are connected to the tensioning device 24-30 via the contact rollers 25, the proportion of the sleeve coupling's circumference that is tensioned by the loop 23 is increased.

By placing the rollers 25 behind the supporting component 24 and at a short distance above the supporting component's contact surface, the supporting component 24, working in conjunction with the loop 23, will exert a clamping force around essentially the entire circumference of the sleeve coupling.

For stable contact, the supporting component 24 preferably has a concave shape following the sleeve coupling's curved surface. It is furthermore preferred that the supporting component 24, at least the part of its surface that makes contact with the sleeve coupling 7, is made of an electrically insulating material that also will tolerate the elevated temperatures occurring in welding. Furthermore, it can be an advantage for the tool's supporting component 24 to be replaceable to provide a good fit for various pipe diameters. Larger dimensions will generally be able to be managed with a supporting component, while dimensions smaller than 20 cm in diameter can require a specially adapted supporting component. Furthermore, the supporting component 24 can advantageously be made of a somewhat shape-conforming material that adjusts its contact surface to the particular pipe diameter.

The clamping band 22 in the loop 23 is also made of a flexible material tolerant to elevated temperatures. The clamping band is expediently a band incorporating Kevlar and Teflon. For example, the clamping band 22 is made of Kevlar that has then been impregnated with Teflon.

The supporting component 24 comprises an electrically insulating projection 26. The projection 26 is designed to be received into the slit 8 and to act there as a wall separating the electrically conductive bands 9 bent up over the edges of the slit. The projection 26 can be made to be rectangular or tapered in cross section. The projection 26 is movable—can be moved in and out—so that the depth to which it is placed in the slit can vary depending on the sleeve coupling's thickness.

Two electrodes 21 are incorporated into the supporting component 24, one at each side of the projection 26, for connection of electric current to the electrically conductive band 9, whose ends 10, as mentioned above, have each been bent up on their side of the slit 8. The electrodes 21 are spring-loaded for maximum contact with the band 9. The electrodes 21 are connected to a suitable current source B that can supply the electrodes regulated current for a regulated period of time.

At least one power converter B1 connected to a voltage source is used to produce the current. The power converter B1 comprises a quasi-resonant converter B2 and a transformer.

In cases when the joint is very large, up to 2 meters, two series-connected power converters B1 are used, each connected to its own phase, to two different phases of the line voltage. The two quasi-resonant converters B2 operate synchronously and perform a summation function on the output voltage, which means that there is no need for prior correction, rectification or filtering of each output power, which means that power conversion will be efficient and occur with no energy loss.

In a particularly preferred embodiment, the tensioning device 24-30 has a threaded component 27 securely attached to the supporting component, and a threaded component 28 that can move relative to threaded component 27 and in the opposite direction, plus a tensioning screw 29 connecting these threaded components to one another, wherein these threaded components, working together, act as a turnbuckle in such a way that when the screw 29 is turned in one direction the distance between threaded components 27 and 28 increases, and when the screw is turned in the opposite direction, threaded components 27 and 28 draw closer to one another. Furthermore, the threaded components 27 and 28 are prevented in an expedient way from rotating relative to one another, by means of an articulated joint 30, guide rails, guide channels or similar designs known to one skilled in the art, where one component is permitted to move lengthwise but is not permitted to rotate.

Here the clamping band's free ends 22.1 and 22.2 are placed near the movable threaded component 28. One end 22.1 of the clamping band is fixed in place, while the other end 22.2 is non-permanently clamped in a fastening device 31. The fastening device 31 has a stepless-clamp securing device where the clamping band 22 is inserted into an eccentric locking system. The locking system allows the clamping band 22 to run freely in one direction so that the loop 23 can be tightened by hand around the sleeve coupling 7. When the loop 23 is around the sleeve coupling 7, the tensioning screw 29 is turned, whereupon the clamping band 22 changes its direction of movement in the fastening device 31 and self-locks in the eccentric locking system.

An alternative design is for the fastening device 31 to have a stepless-clamp securing device where the clamping band 22 is inserted into a slot in a fastening component that can rotate on its own axis. When the fastening component is rotated, the clamping band 22 is wound up around the fastening component and the clamping band 22 is tightened owing to the friction originating between each winding of the clamping band 22.

The example that has been presented of the tensioning device's 24-30 design can of course vary within the inventive concept, wherein the tension can be produced by means of levers or rollers or other linear or nonlinear band-tensioning methods. For example, the tensioning screw 29 can be replaced by a hydraulic or pneumatic device or a device that can be operated in another manner, e.g., cylinders or gear racks, acting between the supporting component and the clamping band's ends.

A preferred but not mandatory distinctive feature is that the loop 23 is tensioned via tensile forces at both its ends, in order to provide a balanced clamping force.

According to the present invention, when the circumferential weld joints have been made, a hand router or the like is to be used to rout out the sleeve coupling's axial slit 8 at its ends too, removing the parts of the band 9 that have projected into the slit. At the same time, this enlarging of the slit 8 will ensure good contact of the material along the entire slit 8.

In extremely exposed locations, e.g., under walls, waterways, etc., according to the present invention it is possible to foam the space behind the sleeve coupling 7 before making the lengthwise weld joint. In this case, the hole for the foam is drilled in the slit through a backing, and when the foaming has been performed the hole is welded closed at the same time as the slit in the sleeve coupling, whereby plug welding is avoided, and the finished sleeve coupling will have two circumferential weld joints bridged by a lengthwise weld joint. A potential source of failure has been avoided.

Figure 7:
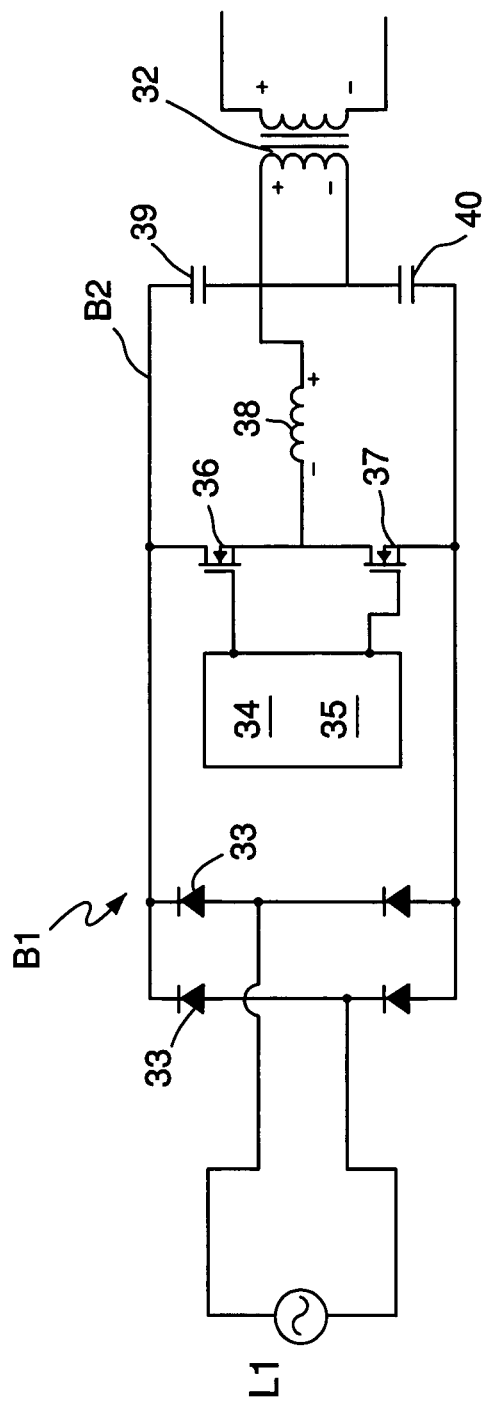
FIG. 7 shows a circuit diagram of a power unit of the invention.

FIG. 7 shows a circuit diagram for a power converter B1 of the invention.

The power converter B1 has a quasi-resonant converter B2 which is connected to a voltage source, and a transformer 32 which is connected to the welding apparatus and the electrodes 21.

The quasi-resonant converter B2 has diodes 33 for full-wave rectification, a combined FET driver 34 and oscillator 35, and a half-bridge 36, 37 with semiconductors. The converter B2 also has a choke 38 and a capacitive voltage divider with two capacitors 39, 40 connected in series with the transformer's 32 primary winding. This circuit creates, at frequencies above the resonance frequency, zero-voltage switching and sinusoidal current, where the choke 38 forms the up-slope and the capacitors 39, 40 the down-slope of the current through the transformer (thus the name "quasi-resonant"). This is advantageous inasmuch as a small number of overtones are produced, and it is easy to meet electromagnetic interference (EMC) requirements in the entire assembly without extensive filtering.

As mentioned above, the quasi-resonant converter operates at a frequency in the range of 20-50 kHz. Owing to the frequency interval indicated, it is especially expedient to use special components known on the market as IGBT (Insulated Gate Bipolar Transistor) modules in designing the quasi-resonant power converter of the invention.

There are also on the market small, lightweight transformers that are particularly suitable for use in the power converter B1. Such a transformer helps to make the power unit smaller in size and lighter in weight than prior-known power units.

By designing the power converter B1 in this way, high efficiency and a low filtering requirement are achieved despite the fact that the power output has no filtering circuit and the output voltage is totally unfiltered. Owing to the fact that rectification, correction or filtering of the output voltage are avoided, efficiency is markedly increased in the power unit of the invention, compared to the known art.

Power conversion works as follows:

The incoming line voltage is full-wave rectified by diodes 33 and supplies the half-bridge 36, 37, which in turn drives a transformer 32 via the series choke 38. The other side of the transformer's primary winding leads to the capacitive voltage divider comprising two capacitors 39, 40. The semiconductors in the half-bridge 36, 37 are controlled by the combined FET driver 34 and oscillator 35, so that the operating frequency is always above the resonance frequency for the choke and the capacitors (6-7). A frequency near the resonance frequency for the circuit will produce maximum output power. If the frequency is higher, the power output from the converter B1 will be reduced. The power converter's operating frequency is in the range of 20-50 kHz.

Figure 8:
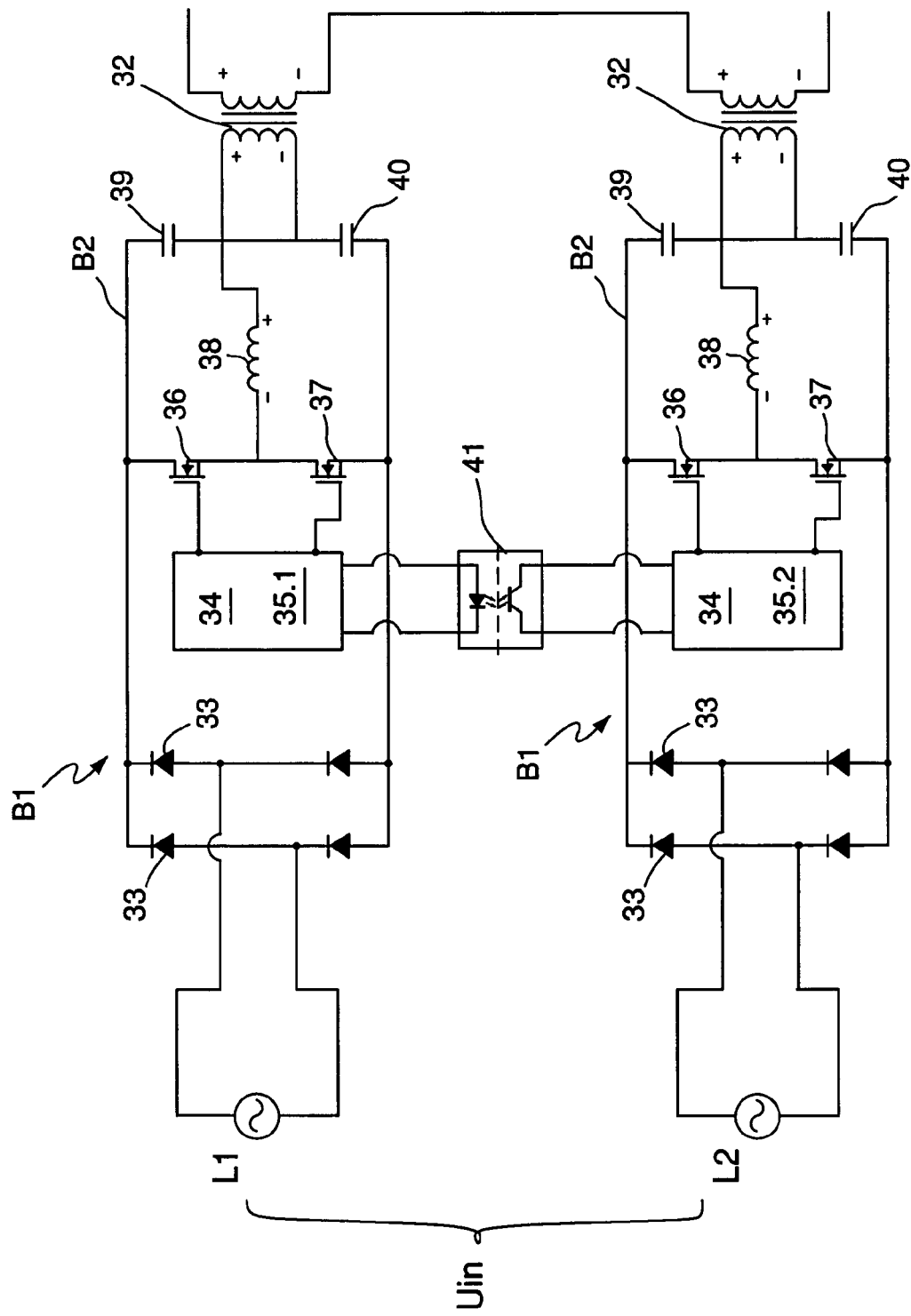
FIG. 8 shows a circuit diagram of two power units of the invention connected in series.

FIG. 8 shows a circuit diagram for two power converters according to the invention connected in series. The power converters B1 are connected in series at the output side in order to produce high output power. One power converter normally produces approximately 3 kW of output power; by connecting the power converters B1 in series, this output power is doubled to 6 kW.

In FIG. 8 it is shown that two power converters B1 are connected together to work together and increase the continuous power output. The power converters B1 can each be connected to their own voltage source.

However, it is highly advantageous to connect each of the power converters B1 to its own phase, L1 and L2, of the same voltage source, as shown in FIG. 8. In this way the power output is limited to 16 A per phase with a three-phase supply, at the same time as the maximum power output is doubled.

In FIG. 8 it is shown that the two power converters are connected in series by the fact that the secondary windings of the individual transformers are interconnected. To enable doubling of the output voltage, the oscillators are synchronized via an isolated signal-transfer circuit 41; e.g., via an optically coupled isolator, signal transformers or a similar isolated signal-transfer mechanism. This way the quasi-resonant converters are forced to operate completely (100%) synchronously. This results in the fact that the continuous output voltage is doubled because the voltage at the transformers is 100% in phase with the half-bridges' switching frequency.

The fact that the quasi-resonant converters' input voltage is phase-shifted 120 degrees has no effect on doubling of the continuous output voltage.

Figure 9:
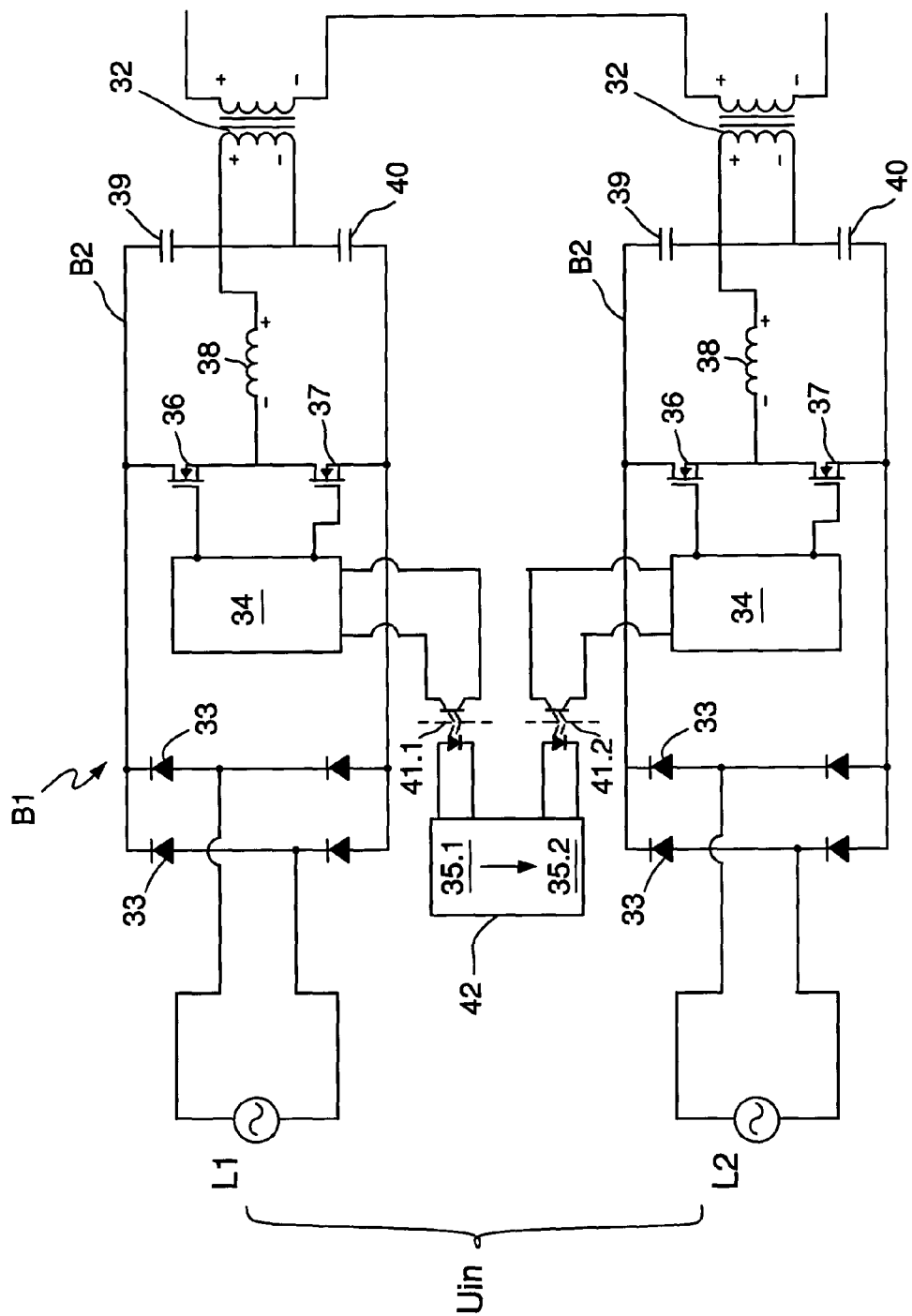
FIG. 9 shows another embodiment of the circuit diagram shown in FIG. 8.

FIG. 9 shows another embodiment of the circuit diagram shown in FIG. 8.

The series-connected power converters B1 have a shared controller 42 that comprises two oscillators 35.1 and 35.2. The controller is connected by means of signal transformers such as optically coupled isolators 41.1 and 41.2 to individual power converters B2.

The individual optically coupled isolators 41.1, 41.2 are driven individually by individual oscillators 35.1, 35.2. Optionally, both optically coupled isolators 41.1, 41.2 are driven by one of the oscillators so that the optically coupled isolators operate synchronously, and accordingly the power converters B2 also operate synchronously.

When the two power converters B1 are operated separately for welding two weld joints, oscillators 35.1 and 35.2 operate separately from one another and drive individual optically coupled isolators or signal transformers totally separately. When the outputs of power converters B1 are connected in series for welding a joint, both optically coupled isolators 41.1 or 41.2 are driven by the same oscillator—oscillator 35.1, for example—and synchronous operation is achieved totally automatically.

An apparatus of the invention has, owing to its few components, low weight, which substantially improves the installer's working environment, inasmuch as work of this type is quite not uncommonly performed in quite complicated and hard-to-access environments.

The distinctive technical features in the form of components and parts as described herein above can be freely combined within the inventive conception as long as the result corresponds to the design as described in the Claims.

The invention claimed is:

1. A method for installation and repair of insulated piping, wherein the insulated piping comprises an outer pipe made of a weldable polymer material that encases an inner pipe embedded in an insulating layer, and wherein the inner pipe has been substantially exposed over a section between ends of the two outer pipes, the method comprising:

placing a sleeve coupling, made of a weldable polymer material incorporating a slit that runs lengthwise along the piping, and whose length exceeds the distance between the outer pipes' ends, over the exposed section of the inner pipe so as to overlap the ends of the outer pipes; and welding the sleeve coupling to the outer pipe at the ends of the outer pipes, by placing an electrically conductive band between the outer pipe and the sleeve coupling, ensuring that free ends of the band project upward through the slit, wherein electric current is connected to the band at the ends brought up through the slit, for a determined period of time, to heat the band and the surrounding polymer material so that they fuse together around the band in order to form a weld joint, and wherein a power converter which has a quasi-resonant converter is employed to produce the electric current that is to be connected to the band, and the quasi-resonant converter comprises a half bridge, a transformer, a choke coil directly connected between the half bridge and the transformer and a pair of an FET driver and an oscillator which is directly connected to the half bridge.

2. A method for installation and repair of insulated piping, wherein the insulated piping comprises an outer pipe made of a weldable polymer material that encases an inner pipe embedded in an insulating layer, and wherein the inner pipe has been substantially exposed over a section between ends of the two outer pipes, the method comprising:

placing a sleeve coupling, made of a weldable polymer material incorporating a slit that runs lengthwise along the piping, and whose length exceeds the distance between the outer pipes' ends, over the exposed section of the inner pipe so as to overlap the ends of the outer pipes; and welding the sleeve coupling to the outer pipe at the ends of the outer pipes, by placing an electrically conductive band between the outer pipe and the sleeve coupling, ensuring that free ends of the band project upward through the slit, wherein electric current is connected to the band at the ends brought up through the slit, for a determined period of time, to heat the band and the surrounding polymer material so that they fuse together around the band in order to form a weld joint, and wherein two series-connected power converters that are connected to two different power sources of different phases are employed, the output voltage is summed via the synchronous operation of two quasi-resonant converters in order to produce the electric current that is to be connected to the band.

3. A method according to claim 1, wherein a band that is laminated with a polymer material is employed.

4. A method according to claim 3, wherein the polymer material is brushed before the band is placed between the sleeve coupling and the outer pipe.

5. A method according to claim 1, wherein the slit is extrusion-welded.

6. A method according to claim 5, wherein the slit is enlarged to a uniform width along the sleeve coupling's entire length by routing.

7. A method according to claim 5, wherein a hole is drilled through the weld joint to enable pressure-testing of the joint from inside the sleeve coupling.

8. A method according to claim 7, wherein the space between the inner pipe and the sleeve coupling is filled through the drilled hole and that the hole is sealed up.

9. A method according to claim 1, wherein the sleeve coupling is heated to a temperature higher than its crystalline temperature, that the sleeve coupling is cooled to its crystalline temperature, and that the sleeve coupling is heated again, followed by welding of the sleeve coupling to the outer pipe.

10. A method according to claim 1, wherein the quasi-resonant converter operates at frequencies in the range of 20-50 kHz.

11. A method according to claim 2, wherein the power converters are controlled by a shared controller that comprises two oscillators, wherein the controller is connected by means of a signal transformer to individual power converters, and that the individual signal transformers are driven individually by individual oscillators, or that both signal transformers are driven by a single oscillator so that the signal transformers operate synchronously.

12. An apparatus for installation and repair of insulated piping, wherein the insulated piping comprises an outer pipe made of a weldable polymer material that encases an inner pipe embedded in an insulating layer, wherein the inner pipe has been essentially exposed over a section between two of the outer pipes' ends, wherein a sleeve coupling, made of a weldable polymer material incorporating a slit that runs lengthwise along the piping, and whose length exceeds the distance between the outer pipes' ends, is placed over the exposed section of the inner pipe, and wherein an electrically conductive band is placed between the outer pipe and the sleeve coupling, and whose free ends project upward through the slit, the apparatus comprising:

a clamping device that comprises a flexible clamping band that is arranged in a loop around the sleeve coupling;

a tensioning device to which the clamping band's free ends are connected when the tensioning device is to tighten and retain the clamping-band loop for pressing the sleeve coupling against the outer pipe, the tensioning device comprising a supporting component that makes contact with the sleeve coupling, an electrode element, and two contact rollers that are arranged parallel to one another nearby the supporting component with a distance between one another that is substantially smaller than the sleeve coupling's outside diameter, and wherein the clamping band runs between the contact rollers from the loop; and a power converter which has a quasi-resonant converter for producing the electric current that is to be connected to the band at the ends brought up through the slit, for a determined period of time, to heat the band and the surrounding polymer material so that they fuse together around the band in order to form a weld joint, the quasi-resonant converter comprising a half bridge, a transformer, a choke coil directly connected between the half bridge and the transformer and a pair of an FET driver and an oscillator which is directly connected to the half bridge.

13. An apparatus for installation and repair of insulated piping, wherein the insulated piping comprises an outer pipe made of a weldable polymer material that encases an inner pipe embedded in an insulating layer, wherein the inner pipe has been essentially exposed over a section between two of the outer pipes' ends, wherein a sleeve coupling, made of a weldable polymer material incorporating a slit that runs lengthwise along the piping, and whose length exceeds the distance between the outer pipes' ends, is placed over the exposed section of the inner pipe, and wherein an electrically conductive band that is pervious to molten plastic is placed between the outer pipe and the sleeve coupling, and whose free ends project upward through the slit, wherein the apparatus comprising:

a clamping device that comprises a flexible clamping band that is arranged in a loop around the sleeve coupling;

a tensioning device to which the clamping band's free ends are connected when the tensioning device is to tighten and retain the clamping-band loop for pressing the sleeve coupling against the outer pipe, the tensioning device comprising a supporting component that makes contact with the sleeve coupling, an electrode element, and two contact rollers that are placed parallel to one another nearby the supporting component with a distance between one another that is substantially smaller than the sleeve coupling's outside diameter, and wherein the clamping device runs between the contact rollers from the loop; and two series-connected power converters that are connected to two different power sources of different phases and two quasi-resonant converters that, via synchronous operation, sum the output voltage by performing a summation function to produce the electric current that is to be connected to the band at the ends brought up through the slit, for a determined period of time, to heat the band and the surrounding polymer material so that they fuse together around the band in order to form a weld joint.

14. An apparatus according to claim 12, characterized in that the band is laminated with a polymer material.

15. An apparatus according to claim 12, characterized in that the flexible clamping band comprises Kevlar and Teflon.

16. An apparatus according to claim 12, characterized in that the supporting component, at the part of its surface that makes contact with the sleeve coupling, is concave for good contact with the outside of the curved sleeve coupling, and is made of an electrically insulating material.

17. An apparatus according to claim 12, characterized in that the supporting component comprises an electrically insulating projection designed to be received into the slit and there to separate the band coming from opposite sides of the slit and comprising electrical conductors, and that electrodes are placed on each side of the projection for connection of the electric current to the band.

18. An apparatus according to claim 12, characterized in that the tensioning device has a threaded component securely attached to the supporting component and a threaded component that can move relative to threaded component and in the opposite direction, and a threaded tensioning screw connecting these threaded components to one another, and that the free ends of the flexible clamping band are placed near the moving threaded component, and that at least one of the fastening devices has a stepless fastening device for the band.

19. An apparatus according to claim 12, characterized in that the quasi-resonant converter is designed to operate at frequencies in the range of 20-50 kHz.

20. An apparatus according to claim 12, characterized in that the power converter has a transformer which is connected to the electrodes.

21. An apparatus according to claim 12, characterized in that the quasi-resonant converter has an oscillator, a half-bridge, a choke, and at least two capacitors connected in series with the transformer's primary winding.

22. An apparatus according to claim 13, characterized in that the series connection of the two power converters comprises interconnection of the secondary windings of the individual transformers.

23. An apparatus according to claim 13, characterized in that the series connection of the two power converters comprises an isolated signal-transfer connection to bring about synchronization of the two oscillators.

24. An apparatus according to claim 13, characterized in that the series-connected power converters have a shared controller that comprises two oscillators, and that the controller is connected by means of signal transformers to the individual power converters.

* * * * *